(12) United States Patent
Dietz (10) Patent No.: US 10,184,070 B2
(45) Date of Patent: Jan. 22, 2019

(54) THERMOSETTABLE ADHESIVE TAPE, ARTICLES AND METHODS

(71) Applicant: 3M INNOVATIVE PROPERTIES COMPANY, St. Paul, MN (US)

(72) Inventor: Peter T. Dietz, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 815 days.

(21) Appl. No.: 13/968,513

(22) Filed: Aug. 16, 2013

(65) Prior Publication Data

US 2013/0330493 A1 Dec. 12, 2013

Related U.S. Application Data

(62) Division of application No. 11/817,529, filed as application No. PCT/US2006/007321 on Mar. 2, 2006, now Pat. No. 8,535,473.

(Continued)

(51) Int. Cl.
*B32B 37/14* (2006.01)
*C09J 7/02* (2006.01)
(Continued)

(52) U.S. Cl.
CPC .............. *C09J 7/0217* (2013.01); *B32B 37/14* (2013.01); *C09J 7/35* (2018.01); *C09J 7/385* (2018.01);
(Continued)

(58) Field of Classification Search
None
See application file for complete search history.

(56) References Cited

U.S. PATENT DOCUMENTS 5,086,088 A * 2/1992 Kitano ................... C08F 283/10
522/100
5,095,046 A * 3/1992 Tse ......................... C09J 123/08
523/206

(Continued)

FOREIGN PATENT DOCUMENTS

EP 1564239 8/2005
WO WO 03/099953 12/2003

*Primary Examiner* — Ronak C Patel
*Assistant Examiner* — Thomas A Mangohig
(74) *Attorney, Agent, or Firm* — Harold C. Knecht III (57) ABSTRACT

A thermosettable pressure sensitive adhesive tape comprising at least first and second adhesive layers bonded together. Each of the adhesive layers comprises a thermosettable pressure sensitive adhesive, which is the photo-polymerization reaction product of starting materials. The starting materials for each adhesive layer comprises at least a photo-polymerizable acrylic component and a thermosettable epoxy component. The thermosettable pressure sensitive adhesive, used for either of the two adhesive layers, is not black when fully cured without the presence of a black coloring pigment. The first adhesive layer is made from a layer of starting materials that is thin enough to allow substantial photo-polymerization of the starting materials, even with the starting materials containing a sufficient amount of a black coloring pigment to cause the first adhesive to have a black color after the first adhesive is substantially cured. The second adhesive layer is made from a layer of starting materials which has a thickness that would be sufficiently thick to prevent substantial photo-polymerization (e.g., with UV light) of the starting materials, if the starting materials contained enough of a black coloring pigment to cause the second adhesive to have a black color after the second adhesive is cured.

19 Claims, 1 Drawing Sheet

Related U.S. Application Data (60) Provisional application No. 60/658,119, filed on Mar. 3, 2005.

(51) Int. Cl.
*C09J 163/00* (2006.01)
*C09J 7/35* (2018.01)
*C09J 7/38* (2018.01)
*C08K 3/04* (2006.01)

(52) U.S. Cl.
CPC ............... C09J 163/00 (2013.01); *C08K 3/04* (2013.01); *C08L 2666/04* (2013.01); *C09J 2201/36* (2013.01); *C09J 2205/102* (2013.01); *C09J 2433/00* (2013.01); *C09J 2463/00* (2013.01); *Y10T 428/1452* (2015.01); *Y10T 428/1476* (2015.01); *Y10T 428/2495* (2015.01); *Y10T 428/24967* (2015.01); *Y10T 428/269* (2015.01); *Y10T 428/287* (2015.01); *Y10T 428/2848* (2015.01)

(56) References Cited

U.S. PATENT DOCUMENTS

| | | | |
|---|---|---|---|
| 6,045,895 A * | 4/2000 | Hyde | B32B 7/02 428/213 |
| 6,284,378 B1 * | 9/2001 | Junghans | C09J 7/0246 428/192 |
| 6,348,118 B1 | 2/2002 | Johnson | |
| 7,177,075 B2 | 2/2007 | Simpson | |
| 2002/0132122 A1 * | 9/2002 | Marutsuka | C08K 5/0041 428/411.1 |
| 2014/0377705 A1 * | 12/2014 | Koyama | C08F 290/12 430/285.1 |

* cited by examiner

US 10,184,070 B2

THERMOSETTABLE ADHESIVE TAPE, ARTICLES AND METHODS

TECHNICAL FIELD

The present invention relates to thermosettable pressure sensitive adhesive (PSA) tape, in particular such tape having a black surface, and articles comprising such tape, as well as methods of making same.

BACKGROUND

Many different types of adhesive tape have been used in a variety of ways to adhere many different types of substrates together. For example, in U.S. Pat. No. 5,086,088, a pressure-sensitive thermosetting adhesive is disclosed that comprises a photo-polymerizable prepolymeric or monomeric syrup containing an acrylic ester and a polar copolymerizable monomer, an epoxy resin or a mixture of epoxy resins containing no photo-polymerizable groups, a heat-activatable hardener for the epoxy resin, a photoinitiator, and a photocrosslinking agent. In addition, U.S. Pat. No. 6,348,118 also discloses a method of bonding a component to glass, where the method comprises disposing a pressure-sensitive adhesive sheet material between the component and the glass so that the adhesive sheet material is adhered to the component and the glass. A disclosed adhesive sheet material comprises the photo-polymerization reaction product of starting materials comprising: (a) a monomeric mixture or partially prepolymerized syrup comprising at least one acrylic acid ester of an alkyl alcohol and at least one copolymerizable monomer; (b) an epoxy resin or a mixture of epoxy resins, (c) a heat-activatable hardener for the epoxy resin or mixture of epoxy resins, (d) a photoinitiator, and (e) a pigment.

The present invention provides an improvement in such adhesive technology.

DISCLOSURE OF INVENTION

In accordance with one aspect of the present invention, a thermosettable pressure sensitive adhesive tape is provided. The tape comprises two adhesive layers bonded together, each of which has a thickness and comprises a thermosettable pressure sensitive adhesive, which is the photo-polymerization reaction product of starting materials. The starting materials for each adhesive layer comprises at least a photo-polymerizable acrylic component (e.g., with ultraviolet light) and a thermosettable (e.g., heat curable) epoxy component. The acrylic component can include, for example, a partially polymerized composition (e.g., a prepolymerized syrup) and/or a monomeric mixture comprising at least one acrylic acid ester or methacrylic acid ester of an alkyl alcohol (e.g., a non-tertiary alcohol). The acrylic component can also include a copolymerizable monomer (e.g., a moderately polar copolymerizable monomer) and a photoinitiator. The epoxy component can include, for example, a curable epoxy resin or a mixture of epoxy resins. The curable epoxy resin can be, or the mixture of epoxy resins can include, a heat curable epoxy resin. The starting materials for either or both of the adhesive layers can include a heat curable epoxy resin. When a heat curable epoxy resin is used, a heat-activatable hardener can be included in the applicable starting materials. The epoxy component can contain some or no photo-polymerizable groups. The starting materials for the two adhesive layers can have the same or different acrylic component and/or epoxy component.

The thermosettable pressure sensitive adhesive, used for either of the two adhesive layers, is not black when fully cured without the presence of a black coloring pigment. The thermosettable pressure sensitive adhesive (i.e., a first adhesive) used for one of the adhesive layers (i.e., a first adhesive layer) includes a black coloring pigment (e.g., carbon black), and the starting materials for this first adhesive includes a sufficient amount of the black coloring pigment to cause the first adhesive to have a black color after the first adhesive is substantially cured. The starting materials for the thermosettable pressure sensitive adhesive (i.e., a second adhesive) used for the other adhesive layer (i.e., a second adhesive layer) either do not include any black coloring pigment (e.g., carbon black) or at least do not contain an amount of a black coloring pigment that would cause the second adhesive to have a black color after the second adhesive is substantially cured. As used here, substantially cured refers to the adhesive being completely cured or at least cured enough so the resulting adhesive layer is suitable for use in structurally bonding together two desired substrates.

The present tape has the first adhesive layer bonded to one major surface of the second adhesive layer. Optionally, another or third adhesive layer can be bonded to the opposite major surface of the second adhesive layer, where this other adhesive layer is the same as, or similar to, the first adhesive layer in that the other adhesive layer is substantially photo-polymerized and has enough black coloring pigment to have a black color.

The first adhesive layer is made from a layer of starting materials that is thin enough to allow substantial photo-polymerization (e.g., with ultraviolet (UV) light) of the starting materials, at least the acrylic component, even with the starting materials containing a sufficient amount of the black coloring pigment to cause the first adhesive to have a black color after the first adhesive is substantially cured. As used here, substantial photo-polymerization refers to complete polymerization, as a practical matter, or at least the degree of polymerization needed to allow the resulting photo-polymerized layer to be used in the desired thermosettable pressure sensitive adhesive tape. In accordance with the present invention, the term black can refer to a range of colors from dark grey to black. The color black, as used herein, can also be seen as having an L* specular excluded number of 32 or less, or preferably of 30 or less. The second adhesive layer is made from a layer of starting materials which has a thickness that would be sufficiently thick to prevent substantial photo-polymerization (e.g., with UV light) of the starting materials, at least the acrylic component (i.e., completely prevented or at least prevented enough to stop the resulting photo-polymerized layer from being effectively used in the desired thermosettable pressure sensitive adhesive tape), if the starting materials contained enough of a black coloring pigment to cause the second adhesive to have a black color after the second adhesive is cured.

In accordance with another aspect of the present invention, an article is provided that includes the above describe adhesive tape adhered to at least one substrate. The tape can have one side defined by the first adhesive layer and another side defined by the second adhesive layer, with a release liner being disposed so as to protect at least one side or the other, or both sides, of the tape. An opaque or translucent substrate (e.g., a mirror button or hinge plate) can be adhered to the second adhesive layer of the tape. The tape can have a periphery in the shape of the opaque or translucent substrate (e.g., a mirror button or a hinge plate) or a number of the substrates can be adhered at separate locations on the second adhesive layer of the tape. The first adhesive layer of the tape can be adhered to a transparent substrate such as, for example a window (e.g., a windshield of a vehicle such as, for example, an automobile, watercraft, aircraft, spacecraft). As used here, a transparent substrate refers to a substrate that is optically clear or at least partially transparent to visible light, that is, the substrate is sufficiently transparent that an observer can see whether the first adhesive layer is black through the substrate (e.g., transparent enough to allow at least about 15%, or at least about 30%, of visible light to be transmitted therethrough).

The thickness of the first adhesive layer can be in the range of from about 3 mils to about 12 mils, in the range of from about 4 mils to about 8 mils, or in the range of from at least about 5 mils up to about 6 mils. The thickness of the second adhesive layer can be in the range of from about 15 mils to about 30 mils or can also be in the range of from about 20 mils to about 25 mils. The black coloring pigment content in the starting materials of the first adhesive should be at least about 0.125% and may be up to about 5% or even more, by weight of the starting materials. The black coloring pigment content in the starting materials of the first adhesive can preferably be in the range of at least about 0.25% and up to about 0.75% or more, by weight of the starting materials. The black coloring pigment content in the starting materials of the second adhesive can be in the range of from 0.0% up to about 0.1% by weight of the starting materials. In general, it is believed that the weight percent (wt. %) concentration of pigment can be increased as the pigment particle size being used is increased.

In accordance with an additional aspect of the present invention, a method of making a thermosettable pressure sensitive adhesive tape is provided. The method comprises: forming a first starting materials layer of photo-polymerizable first starting materials; forming a second starting materials layer of photo-polymerizable second starting materials; photo-polymerizing (e.g., with ultraviolet (UV) light) the first starting materials layer so as to produce a first adhesive layer having a first thickness and comprising a first thermosettable pressure sensitive adhesive; photo-polymerizing (e.g., with ultraviolet (UV) light) the second starting materials layer so as to produce a second adhesive layer having a second thickness and comprising a second thermosettable pressure sensitive adhesive; and bonding the first adhesive layer to a major surface of the second adhesive layer.

The first starting materials comprise a photo-polymerizable acrylic component (e.g., like that described above), a thermosettable epoxy component (e.g., like that described above), and a black coloring pigment (e.g., carbon black). The second starting materials comprise a photo-polymerizable acrylic component (e.g., like that described above) and a thermosettable epoxy component (e.g., like that described above). The first starting materials and the second starting materials can have the same or different acrylic component and/or epoxy component. The epoxy component of either starting materials, or both starting materials, can be heat curable. The first adhesive is not black when cured (e.g., by heat curing) without the presence of the black coloring pigment. The first starting materials include a sufficient amount of the black coloring pigment to cause the first adhesive to have a black color after the first adhesive is substantially cured. The second adhesive is not black when cured (e.g., by heat curing) without the second adhesive including enough of a black coloring pigment. The second starting materials either do not include any black coloring pigment (e.g., carbon black) or at least do not contain an amount of a black coloring pigment that would cause the second adhesive to have a black color after the second adhesive is substantially cured. As used here, substantially cured refers to the adhesive being completely cured or at least cured enough so the resulting adhesive layer is suitable for use in structurally bonding together two desired substrates.

The first starting materials layer is thin enough to allow substantial photo-polymerization (e.g., with ultraviolet (UV) light) of the first starting materials, at least the acrylic component, even with the first starting materials containing a sufficient amount of the black coloring pigment to cause the first adhesive to have a black color after the first adhesive is substantially cured. As used here, substantial photo-polymerization refers to complete polymerization, as a practical matter, or at least the degree of polymerization needed to allow the resulting photo-polymerized layer to be used in the desired thermosettable pressure sensitive adhesive tape. The second starting materials layer has a thickness that would be sufficiently thick to prevent substantial photo-polymerization (e.g., with UV light) of the second starting materials, at least the acrylic component (i.e., completely prevented or at least prevented enough to stop the resulting photo-polymerized layer from being effectively used in the desired thermosettable pressure sensitive adhesive tape), if the second starting materials contained enough of a black coloring pigment to cause the second adhesive to have a black color after the second adhesive is cured.

The method can further comprise disposing a release liner, so as to protect, at least one or both of the first adhesive layer and the second adhesive layer. The method can also further comprise laminating the first adhesive layer and the second adhesive layer so as to be adhered together. In addition, each starting materials layer can be disposed between two transparent, and preferably optically clear, liners during its corresponding photo-polymerizing.

In accordance with a further aspect of the present invention, a method of making an assembly is provided, where the method comprises making a tape as described above and adhering an opaque or translucent substrate to the second adhesive layer. The substrate being adhered to the second adhesive layer can be, for example, a mirror button or a hinge plate. With such an assembly, the tape can have a periphery in the shape of the opaque or translucent substrate (e.g., a mirror button or a hinge plate) or a number of the substrates can be adhered at separate locations on the second adhesive layer of the tape. The first adhesive layer of the tape can be adhered to a transparent substrate such as, for example a window (e.g., a windshield of a vehicle such as, for example, an automobile, watercraft, aircraft, spacecraft). As used here, a transparent substrate refers to a substrate that is optically clear or at least partially transparent to visible light, that is, the substrate is sufficiently transparent that an observer can see whether the first adhesive layer is black through the substrate (e.g., transparent enough to allow at least about 15%, or at least about 30%, of visible light to be transmitted therethrough).

MODES FOR CARRYING OUT THE INVENTION

Thermosettable pressure sensitive adhesive tapes, like those disclosed in U.S. Pat. Nos. 5,086,088 and 6,348,118, have been used to bond substrates together, like rear view mirror brackets or buttons to the inside surface of automotive windshields. These tapes are typically 20 to 25 mils thick and have an ultraviolet (UV) photo-polymerized pressure sensitive acrylic component and a heat curable epoxy component. Automotive windshields are usually a laminate of two sheets of glass bonded together by an intermediate thermoplastic adhesive layer of polyvinyl butyral (PVB) at elevated temperature and pressure using, for example, conventional autoclave equipment and processing. The mirror button is typically initially adhered with the PSA characteristics of this tape to the windshield before the windshield is autoclaved. The epoxy component of the tape is then heat cured during the autoclave process to provide a structural bond between the mirror button and the windshield. Prior to the final heat cure the tape is typically black. After final heat curing, the tape changes to a medium grey or lighter color, because of a phase separation that is believed to occur between epoxy and acrylate phases during the heat curing process. A black color has been considered more aesthetically desirable then the lighter colors. One way to make the use of such a tape more acceptable would be to apply a black frit to the surface of the windshield so as to cover the adhesive surface. However, the use of such frit has been known to weaken the windshield glass and is, therefore, not desirable.

Prior to this invention, the technical assessment of making a black thermosettable pressure sensitive tape was pessimistic due to the inability to adequately UV photo-polymerize the entire thickness (e.g., about 20 mils or more) of such a tape that has been loaded with enough pigment to achieve a black color. Surprisingly, it has been found that such thermosettable pressure sensitive adhesive tapes can be made to exhibit a black color, on one or both of its major surfaces, even after final heat curing. To accomplish this, a relatively thin veneer of adhesive (e.g., 5 mil), made from highly pigmented starting materials, is laminated to one or both sides of a relatively thick layer of adhesive (e.g., 20 mil), made from starting materials that had a conventionally low level of pigment (i.e., an amount that was low enough not to significantly inhibit UV photo-polymerization of the entire thickness). Because the highly pigmented veneer is much thinner, UV radiation is able to reach the center of the adhesive layer and substantially UV cure or photo-polymerize the starting materials. If the highly pigmented starting material is coated at the standard thicknesses for one-layer tapes, the center of the adhesive layer is not adequately UV photo-polymerized, because the higher amounts of pigment absorb too much of the UV radiation, thus preventing enough UV energy from reaching, and curing, the center of the adhesive layer.

Figure 1:
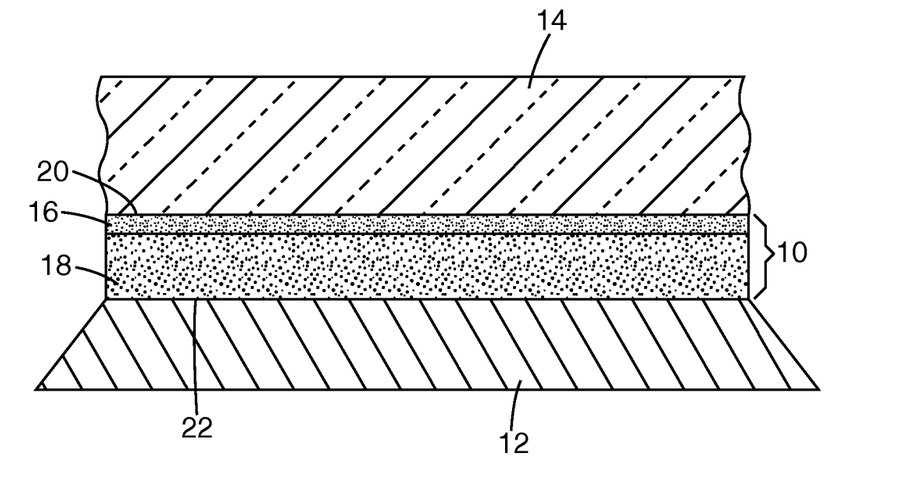
FIG. 1 is cross-sectional view of an assembly according to one embodiment of the present invention.

Referring to FIG. 1, a thermosettable pressure sensitive adhesive (PSA) tape 10, according to one embodiment of the present invention, is shown adhering a substrate 12 (e.g., a mirror button) to the surface of a window 14 (e.g., a windshield for a vehicle). The tape 10 comprises a first adhesive layer 16 bonded to a major surface of a second adhesive layer 18, each of which has a thickness and comprises a thermosettable pressure sensitive adhesive, which is the photo-polymerization reaction product of starting materials. Examples of such adhesives can be found in U.S. Pat. Nos. 5,086,088 and 6,348,118, which are incorporated herein by reference in their entirety. The starting materials for each adhesive layer 16 and 18 comprise an acrylic component that is photo-polymerizable with ultraviolet light and a heat curable epoxy component. The acrylic component includes a partially polymerized composition (e.g., a prepolymerized syrup) and/or a monomeric mixture comprising at least one acrylic acid ester or methacrylic acid ester of an alkyl alcohol (e.g., a non-tertiary alcohol). The acrylic component also includes a copolymerizable monomer (e.g., a moderately polar copolymerizable monomer) and a photoinitiator. The epoxy component includes a heat curable epoxy resin or a mixture of epoxy resins that include a heat curable epoxy resin and a heat-activatable hardener or curing agent for at least the epoxy resin. The starting materials for the two adhesive layers 16 and 18 have the same or different acrylic components and epoxy components.

The first adhesive layer 16 is made from a layer of the first starting materials that is thin enough to allow substantial UV photo-polymerization of the acrylic component, even though the first starting materials contain a sufficient amount of black coloring pigment to cause the first adhesive to have a black color after the first adhesive is substantially heat cured. The second adhesive layer 18 is made from a layer of the second starting materials which has a thickness that would be sufficiently thick to prevent substantial UV photo-polymerization of the starting materials, if the starting materials contained enough of a black coloring pigment to cause the second adhesive to have a black color after the second adhesive is cured.

In accordance with the present invention, the term black refers to a range of colors from dark grey to black. The color black, as used herein, can also be seen as having a pigment concentration and/or an L* specular number as indicated below:

| Pigment limits: | L* specular excluded limits |
|---|---|
| First adhesive layer: | Black Colors: |
| Minimum: 0.125% | 32 |
| Maximum: 5% | 1 |
| Preferred | |
| Minimum: 0.25% | 30 |
| Maximum: 0.75% | 8 |
| Second adhesive layer | Colors not Black |
| Minimum: 0.0% | 90 |
| Maximum: 0.1% | 33 |

In addition to being provided alone, the tape 10 can be provided in the form of an article or assembly that includes the tape 10 adhered to one or both of the substrates 12 and 14. The tape 10 can also be provided with an additional or third adhesive layer (not shown), which is the same as, or similar to, the first adhesive layer 16, bonded to the opposite major surface of the second adhesive layer 18. Such a three layer construction may be desirable when both of the substrates, being adhered together with the tape, are transparent substrates. The tape 10 has one side or major surface 20 defined by the first adhesive layer 16 and an opposite side or major surface 22 defined by the second adhesive layer 18. When the tape 10 is sold alone or with only one of the substrates 12 or 14, a conventional release liner (not shown) is disposed so as to protect any of the sides 20 and 22 that are left exposed (i.e., not adhered to the substrate 12 or 14). As shown in FIG. 1, the tape 10 has a periphery in the shape of the mirror button substrate 12.

The thermosettable pressure sensitive adhesive tape 10 is made by forming a first starting materials layer of the first starting materials; forming a second starting materials layer of the second starting materials; UV photo-polymerizing the first starting materials layer so as to produce the first adhesive layer 16; UV photo-polymerizing the second starting materials layer so as to produce the second adhesive layer 18; and bonding the two layers 16 and 18 together at major surfaces. Each starting materials layer can be formed using conventional methods and techniques, such as that disclosed in the above incorporated patents.

Such a conventional process can use an upper and lower optically clear process liner (e.g., 2 mil thick silicone coated polyester liners), unwind stands with tension control springs to provide frictional tension to the process liners, a notch bar coater with a gap that is adjustable to achieve a desire thickness, and two banks of adjustable low intensity UV lights. In the process, the lower process liner is suspended so as to pass through the gap in the bar coater and through the banks of UV lights. An adhesive starting material is applied on top of the lower process liner and forms a rolling bank at the notch bar coater. The upper process liner wraps around the notch bar coater above the lower liner, passes through the bar coater gap and sandwiches the starting materials therebetween. The two process liners carry the starting materials through the bank of UV lights where UV polymerization of the starting materials, especially the acrylic component, occurs. One bank of the UV lights is positioned above and below the sandwiched starting materials. The UV lights have 90% of emissions between 300 and 400 NM and a peak at 351 nm. Intensity of approximately 2 millwatts per square centimeter, with total energy of about 650 milijoules per square centimeter above and 650 milijoules per square centimeter below. Rubber coated driven nip rollers are used to pull the process liners through notchbar coater gap and banks of UV light.

EXAMPLES

Base solution for Example 1 and 6.

A premix composition was prepared by mixing 75 parts of n-butyl acrylate, 25 parts of N vinyl caprolactam, and 0.04 parts of photoinitiator (alpha, alpha-dimethoxy-alpha-phenylacetophenone available under the tradename Irgacure 651 from Ciba Specialty Chemicals Corporation, Tarrytown N.Y.) and exposing to ultraviolet black lamps to form a syrup having a viscosity of about 1500 cps.

An adhesive composition was prepared by mixing 42.6 parts of the premix composition, 3.2 parts of 2-hydroxy-3-phenoxy propyl acrylate, 29.8 parts of liquid epoxy resin (bisphenol-A epichlorhydrin available under the tradename Epon 828 from Resolution Performance Products LLC, Houston, Tex.) and 16.0 parts of solid epoxy (Epon 1101F) resin (phenol, 4,4'-(1-methylethylidene) bis-, polymer with 2,2'-((1-methylethylidene) bis(4,1-phenylene oxymethylene)) bis(oxirane) with a propellor mixer set at high speed for 30 minutes while heating to about 49° C. to form a uniform mixture. The mixture was then cooled to about 32° C. with continuous mixing and the following were added and mixed for about 30 minutes: 0.02 part of 1,6-hexanedioldiacrylate, 1.1 parts of micronized epoxy accelerator (2,4-diamino-(2'-methylimidazoleyl-(1'))ethyl-S-triazine available under the tradename, Curezol 2MZ-Azine, from Air Products and Chemicals Inc., Allentown, Pa.), 0.05 part of antioxidant (benzene propanoic acid available under the tradename, Irganox 1010, from Ciba Specialty Chemicals Corp.), 3.6 parts of dicyandiamide, 0.6 part of silane (trimethoxy (3-(oxiranylmethoxy)propyl)-silane available under the product number G6720 from Degussa Corp.), and 0.35 part of black pigment dispersion (the dispersion having approximately 15% carbon black pigment in an acrylic carrier available under the tradename Penncolor 9B117 from Penn Color, Inc., Doylestown, Pa.), 2.7 parts fumed silica (fumed silica available under the tradename, Cabosil M-5, available from Cabot Corporation, Billerica, Mass.), and 0.07 part Irgacure 651 photoinitiator were added and mixed at 32° C. for 30 minutes. The uniform mixture was cooled to about 27° C. with continued mixing, and then filtered.

Base Solution for Examples 2,3,4,5:

An adhesive composition was prepared by mixing 30.7 parts of a 50/50 mixture of n-butyl acrylate and N-vinyl-caprolactam, 22.35 parts of butyl acrylate, 23.84 parts of liquid epoxy resin (bisphenol-A epichlorhydrin available under the tradename Epon 828 from Resolution Performance Products LLC, Houston, Tex.) and 13.2 parts of solid epoxy (Epon 1101F) resin (phenol, 4,4'-(1-methylethylidene) bis-, polymer with 2,2'-((1-methylethylidene) bis(4,1-phenylene oxymethylene)) bis(oxirane) with a propellor mixer set at high speed for 30 minutes while heating to about 49° C. to form a uniform mixture. The mixture was then cooled to about 32° C. with continuous mixing and the following were added and mixed for about 30 minutes: 0.025 parts of 1,6-hexanedioldiacrylate, 1.4 parts of non-micronized epoxy accelerator (2,4-diamino-(2'-methylimidazoleyl-(1'))ethyl-S-triazine available under the tradename, Curezol 2MZ-Azine, from Air Products and Chemicals Inc., Allentown, Pa.), 0.05 part of antioxidant (benzene propanoic acid available under the tradename, Irganox 1010, from Ciba Specialty Chemicals Corp.), 3.7 parts of dicyandiamide, and 0.30 part of black pigment dispersion (the dispersion having approximately 15% carbon black pigment in an acrylic carrier available under the tradename Penncolor 9B117 from Penn Color, Inc., Doylestown, Pa.), 4.2 parts fumed silica (fumed silica available under the tradename, Cabosil M-5, available from Cabot Corporation, Billerica, Mass.), and 0.15 part Irgacure 651 photoinitiator were added and mixed at 32° C. for 30 minutes. The uniform mixture was cooled to about 27° C. with continued mixing, and then filtered.

The solution for example one was competed by adding 1 gram of Penncolor 9B117 and 2.5 grams of powdered carbon black To 100 grams of the base solution for example 1 then mixing until evenly dispersed.

The solution for example two was completed by adding 1 gram of Penncolor 9B 117 to 100 grams of the base solution for examples 2,3,4,5 then mixing until evenly dispersed.

The solution for example three was completed by adding 2 grams of Penncolor 9B 117 to 100 grams of the base solution for examples 2,3,4,5 then mixing until evenly dispersed.

The solution for example four was complete by adding 1 gram of Penncolor 9B117 and 2.5 grams of powdered carbon black to 100 grams of the base solution for examples 2,3,4,5 then mixing until evenly dispersed.

The solution for example five was the base solution for examples 2,3,4,5 with no additional pigment.

The solution for example six was the base solution for examples 1 and 6 with no additional pigment.

The compositions were degassed and coated between two silicone release coated polyester films and irradiated with ultraviolet light from the above and below the web as described in the examples of U.S. Pat. No. 6,348,118 for about 3 minutes to form a black tape. The total energy used to cure the adhesive is about 1300 milliJoules/square centimeter (mJ/sq cm). Example 1,2,3,and 4 were coated at 5 mils thick. Examples 5 and 6 were coated at 25 mils thick.

Sample Preparation:

Each of the tapes from Examples 1-4 were laminated to a layer of 20 mil thick 9214 Structural Bonding Tape, sold by 3M Company, St. Paul, Minn. These two layer tapes were subsequently laminated to clean smallfoot mirror buttons with the second layer (thicker/less pigment) attached to the mirror button. The taped mirror buttons were then adhered with the first layer (thinner/more pigment) to the tin side of clean 2 inch by 5 inch tempered glass plates. The glass plates were pre-warmed to 90 C prior to the application of the button. A pneumatic press with a 2-inch cylinder set at 70 psig was used to adhere the taped buttons to the warm glass plates. The mirror button/glass plate assemblies were then autoclaved at about 141° C. and 170 psig with 30 minutes at peak temperature to cure the epoxy phase of the adhesive. The samples were conditioned at ambient temperature overnight before testing.

The sample preparation for examples 5 and 6 was the same as examples 1-4 except the tapes for examples 5 and 6 were not laminated to the 20 mil layer of 9214 Structural Bonding Tape.

Testing:

Torque Testing:

Torque measurements were obtained using a 12-inch lever arm affixed on one end to the mirror button on a firmly mounted mirror button/glass assembly and on the other end to an Instron force measurement machine. The crosshead speed was 6 inches per minutes. The peak force in foot-pounds was recorded. The force exerted on the attached button was in plane with the button as it was attached to the glass. The Failure Mode is also noted as Cohesive (C) in which the adhesive breaks within the adhesive layer leaving material on both the mirror button and the glass; and adhesive from glass (A-G) where most of the adhesive remains on the button and just a thin residual film remains on the glass. Test results are shown in Table 1.

Cleavage Testing:

The cleavage test is a measure of how well a mirror button adheres to a glass plate. Test samples are prepared as described above, and conditioned for at least 24 hours at room temperature and 40-60% relative humidity. The glass plate with the mirror button attached is mounted in a test fixture that is clamped into an Instron Tensile Tester. A 70 mm long lever arm with an attachment end designed to slide over the mirror button in a manner upside-down from how a rearview mirror would attach to it on a windshield. The lever arm is clamped into the jaw of the tensile tester and moved upwardly at a rate of 2.5 millimeters per minute. The maximum value at break, i.e., when the mirror button breaks loose from the glass plate, the force is recorded in pounds. The mode of failure is also observed using the same criteria as for the Torque test.

Color Testing:

Visual subjective color testing was conducted on a three level scale. The levels were Grey, Dark Grey and Black.

Color measurements were also measured using a calibrated X-Rite SP-60 Sphere spectrophotometer using a D-65 light source and a 10 degree angle. L* values were recorded with specular effects include and specular effects excluded. When specular effects are excluded the effect of gloss is reduced and is the preferred method.

The samples for X-rite color measurement were laminated to silicone coater paper then cured in an atmospheric oven at 285C for 35 minutes. After cooling to room temperature the L* measurements were taken.

TABLE 1

| Ex | Carbon black (wt %) | Color | Torque (foot-pounds) | Failure Mode |
|---|---|---|---|---|
| 1 | 2.60 | Black | 25.3 | Cohesive |
| 2 | 0.19 | Dark gray | 45.3 | A-G |

TABLE 1-continued

| 3 | 0.34 | Black | 42.5 | A-G |
| 4 | 2.60 | Black | 31.5 | A-G |
| 5 | 0.05 | Gray | 50.4 | A-G |
| 6 | 0.05 | Gray | 35.2 | Cohesive |

| EX | L* speular excluded | L* Specular included |
|---|---|---|
| 1 | 21.58 | 30.17 |
| 2 | 26.17 | 31.68 |
| 3 | 23 | 29.4 |
| 4 | 22 | 28.5 |
| 5 | 39.23 | 42.2 |
| 6 | Na | Na |

Examples 7-13

Tapes for Examples 7-13 were prepared according to the procedure for the base solution for examples 2,3,4,5 except that the accelerator used was micronized 2MZ-Azine, and the amounts of the carbon black dispersion (Pennco 9B117) were 0.23%, 1.5%, 2.5%, and 3.5% based on the total weight of the composition, and coated in thicknesses of 5 mils and 25 mils. The pigment content, i.e., only the carbon black, is shown in Table 2 also included is the first layer thickness, acrylic cure success, color evaluation, and torque testing. Tapes having a thickness of 25 mils were tested without laminating to another layer of adhesive. The 5 mil tapes were laminated to a 20 mil thick 9214 Structural Bonding Tape. When bonding these two layer samples to glass the first layer (thinner/more pigment) is attached to the glass, the second layer (thicker/less pigment) is attached to the mirror button.

25 mil tapes in Examples 11 and 13 exhibited incomplete acrylic cure and were not be tested for color or torque. All other examples were tested for torque after autoclaving following the procedure in examples 1-6. Samples tested for 100F/100RH were first conditioned 24 hours at room temperature prior to exposure. These samples were then conditioned at 100° F. and 100% relative humidity for 24 hour prior to torque testing.

TABLE 2

| Ex | % Carbon black | First layer thickness | Acrylic cure | Color | RT torque | 100F/100RH torque |
|---|---|---|---|---|---|---|
| 7 | 0.045% | 25 mil | Yes | Grey | 47.6 | 30.0 |
| 8 | 0.22% | 5 mil | Yes | Dark grey | 41.1 | 26.5 |
| 9 | 0.22% | 25 mil | Yes | Dark grey | 24.8 | Na |
| 10 | 0.37% | 5 mil | Yes | Black | 37.4 | 26.9 |
| 11 | 0.37% | 25 mil | No | na | na | na |
| 12 | 0.51% | 5 mil | Yes | Black | 34.4 | 25 |
| 13 | 0.51% | 25 mil | No | na | na | na |

Examples 14-19

Solutions and tapes were prepared for Examples 14-19 according to the procedure for the base solution of 2,3,4,5 except that the pigment dispersions amounts were either 2.8% (0.42% carbon black) or 3.8% (0.57% carbon black). The target thicknesses were 5, 8, and 10 mils for each pigment amount although the actual thicknesses were higher as shown in Table 3. Tapes were prepared by laminating to 9214 Structural Bonding Tape and tested for torque and cleavage with results shown in Table 3. All of the tapes were essentially black in color.

TABLE 3

| Ex | Pigment content (%) | Thickness (mils) target/actual | Torque (foot-pounds)/ Failure Mode | Cleavage (pounds) |
|---|---|---|---|---|
| 14 | 0.42 | 5/7 | 36.7/TFG* | 185/C** |
| 15 | 0.42 | 8/9 | 33/TFG | 161/C |
| 16 | 0.42 | 10/12 | 36.4/TFG | 156/C |
| 17 | 0.57 | 5/7 | 36.7/TFG | 137/C |
| 18 | 0.57 | 8/9 | 38.5/TFG | 133/C |
| 19 | 0.57 | 10/12 | 25/TFG | 101/C |

| Ex | L* speular excluded | L* Specular included |
|---|---|---|
| 14 | 22.58 | 28.7 |
| 15 | 21.75 | 28.55 |
| 16 | 22.2 | 28.8 |
| 17 | 21.3 | 27.5 |
| 18 | 21.1 | 27.9 |
| 19 | 21 | 28 |

*"TFG" = thin film remaining on glass. Majority of adhesive remaining on mirror button.
**"C" = Cohesive failure mode (e.g., 185/C = 185 pounds of force with Cohesive failure.

Examples 20-25

Solution and tapes were prepared for Examples 20-25 according to the procedure for the base solution for examples 2,3,4,5 and the details of Example 3 except that the total amount of carbon black dispersion is varied as shown in Table 4.
The total acrylic cure energy was also varied and the finished tapes were tested for Torque, Cleavage, Stress, Strain, Modulus, and Color.
The Stress, Strain, and Modulus were determined using a an Instron/tensile Tester according to ASTM D-412-98a approved 2002. The Color was measured using a X-Rite SP-60 and the units are reported in L* both with the specular effects excluded and included

TABLE 4

| Ex | Pigment Dispersion (%) | Pigment Content (%) | Total Energy mJ/sq cm | Torque ft-lbs | RT Cleavage (lbs) | Stress (psi) | Strain % | Modulus (ksi) |
|---|---|---|---|---|---|---|---|---|
| 20 | 4.5 | 0.65 | 1300 | 36 | 107 | 1219 | 69 | 10.9 |
| 21 | 3.5 | 0.51 | 1550 | 39 | 127 | 1302 | 73 | 10.9 |
| 22 | 4.5 | 0.65 | 1800 | 38 | 111 | 1251 | 63 | 10.9 |
| 23 | 2.5 | 0.37 | 1800 | 43 | 169 | 1346 | 75 | 12.8 |
| 24 | 3.5 | 0.51 | 1550 | 40 | 148 | 1336 | 84 | 10.5 |
| 25 | 2.5 | 0.37 | 1300 | 44 | 169 | 1348 | 84 | 11.4 |

| Ex | L* specular excluded | L* Specular included |
|---|---|---|
| 20 | 20.8 | 27.7 |
| 21 | 20.5 | 28.3 |
| 22 | 20.2 | 27.9 |
| 23 | 22.3 | 28.9 |
| 24 | 21 | 28.1 |
| 25 | 21.3 | 28.6 |

L* data measured with X-Rite SP-60 sphere spectrophotometer.

What is claimed is:

1. A thermosettable pressure sensitive adhesive tape in combination with a mirror button, a mirror bracket, or a hinge plate adhered to said second adhesive layer, said tape comprising:
a first adhesive layer having a first thickness and comprising a first thermosettable pressure sensitive adhesive which is a photo-polymerization reaction product of first starting materials comprising a photo-polymerizable acrylic component, a thermosettable epoxy component comprising a heat curable epoxy resin, and a black coloring pigment, said first adhesive is not black when cured without said black coloring pigment, and said first starting materials include a sufficient amount of said black coloring pigment to cause said first adhesive to have a black color after said first adhesive is substantially cured; and
a second adhesive layer having a second thickness and comprising a second thermosettable pressure sensitive adhesive which is a photo-polymerization reaction product of second starting materials comprising a photo-polymerizable acrylic component, and a thermosettable epoxy component comprising a heat curable epoxy resin, said second adhesive does not turn black when cured, unless said second adhesive includes enough of a black coloring pigment to cause said second adhesive to have a black color, and said second adhesive does not include an amount of a black coloring pigment that would cause said second adhesive to have a black color after said second adhesive is substantially cured,
wherein said first adhesive layer is made from a layer of the first starting materials that is thin enough to allow substantial photo-polymerization of the first starting materials even with the first starting materials containing said sufficient amount of a black coloring pigment, said second adhesive layer is made from a layer of the second starting materials that is thick enough that substantial photo-polymerization of the second starting materials would be prevented if the second starting materials contained enough of a black coloring pigment to cause said second adhesive to have a black color after said second adhesive is cured, and said first adhesive layer is bonded to a major surface of said second adhesive layer.

2. The combination according to claim 1, wherein said first adhesive layer is made from a layer of the first starting materials that is thin enough to allow substantial ultraviolet photo-polymerization of at least the acrylic component of the first starting materials, even with the first starting materials containing said sufficient amount of the black coloring pigment.

3. The combination according to claim 1, wherein said second adhesive layer is made from a layer of the second starting materials that is thick enough that ultraviolet photo-polymerization of at least the acrylic component of the second starting materials would be substantially prevented, if the second starting materials contained enough of the black coloring pigment to cause said second adhesive to have the black color after said second adhesive is cured.

4. The combination according to claim 1, wherein the epoxy component of at least one of the first starting materials and the second starting materials further comprises a heat-activatable hardener or curing agent for the epoxy resin.

5. The combination according to claim 1, wherein the first starting materials and the second starting materials have the same acrylic component and/or epoxy component.

6. The combination according to claim 1, wherein said tape has one side defined by said first adhesive layer and another side defined by said second adhesive layer, and said tape is in combination with a release liner disposed so as to protect at least one side of said tape.

7. The combination according to claim 1 in combination with an opaque or translucent substrate adhered to said second adhesive layer.

8. The combination according to claim 7, wherein said tape has a periphery in the shape of said opaque or translucent substrate.

9. The combination according to claim 1, wherein said first thickness is in the range of from about 3 mils to about 12 mils.

10. The combination according to claim 1, wherein said second thickness is in the range of from about 15 mils to about 30 mils.

11. The combination according to claim 1, wherein the black coloring pigment content in the first starting materials is at least about 0.125% by weight of the first starting materials.

12. The combination according to claim 1, wherein the black coloring pigment content in the second starting materials is in the range of from 0.0% up to 0.1% by weight of the second starting materials.

13. The combination according to claim 1 in combination with a transparent substrate adhered to said first adhesive layer.

14. The combination according to claim 13, wherein said transparent substrate is a window.

15. The combination according to claim 1, wherein said tape further comprises:
a third adhesive layer having a third thickness and comprising a third thermosettable pressure sensitive adhesive which is a photo-polymerization reaction product of third starting materials comprising a photo-polymerizable acrylic component, a thermosettable epoxy component comprising a heat curable epoxy resin, and a black coloring pigment, said third adhesive is not black when cured without said black coloring pigment, and said third starting materials includes another sufficient amount of said black coloring pigment to cause said third adhesive to have a black color after said third adhesive is substantially cured,
wherein said third adhesive layer is made from a layer of the third starting materials that is thin enough to allow substantial photo-polymerization of the third starting materials even with the third starting materials containing said another sufficient amount of a black coloring pigment, and third adhesive layer is bonded to an opposite major surface of said second adhesive layer.

16. A method of making the combination according to claim 1, said method comprising:
forming a first starting materials layer of the first starting materials;
forming a second starting materials layer of the second starting materials;
photo-polymerizing the first starting materials layer so as to produce the first adhesive layer;
photo-polymerizing the second starting materials layer so as to produce the second adhesive layer;
bonding the first adhesive layer to a major surface of the second adhesive layer; and
bonding the second adhesive layer to a mirror button, a mirror bracket, or a hinge plate.

17. A thermosettable pressure sensitive adhesive tape in combination with a mirror button, a mirror bracket, or a hinge plate, said tape comprising:
a first adhesive layer having a first thickness and comprising a first thermosettable pressure sensitive adhesive which is a photo-polymerization reaction product of first starting materials comprising a photo-polymerizable acrylic component, a thermosettable epoxy component comprising a heat curable epoxy resin, and a coloring pigment, said first adhesive is not the color of said coloring pigment when cured without said coloring pigment, and said first starting materials include a sufficient amount of said coloring pigment to cause said first adhesive to have a color of said first coloring pigment after said first adhesive is substantially cured; and
a second adhesive layer having a second thickness and comprising a second thermosettable pressure sensitive adhesive which is a photo-polymerization reaction product of second starting materials comprising a photo-polymerizable acrylic component, and a thermosettable epoxy component comprising a heat curable epoxy resin, said second adhesive does not turn the color of said coloring pigment when cured, unless said second adhesive includes enough of said coloring pigment to cause said second adhesive to have a color of said coloring pigment, and said second adhesive does not include an amount of said coloring pigment that would cause said second adhesive to have a color of said coloring pigment after said second adhesive is substantially cured,
wherein said first adhesive layer is made from a layer of the first starting materials that is thin enough to allow substantial photo-polymerization of the first starting materials even with the first starting materials containing said sufficient amount of said coloring pigment, said second adhesive layer is made from a layer of the second starting materials that is thick enough that substantial photo-polymerization of the second starting materials would be prevented if the second starting materials contained enough of said coloring pigment to cause said second adhesive to have a color of said coloring pigment after said second adhesive is cured, said first adhesive layer is bonded to a major surface of said second adhesive layer, and said second adhesive layer is adhered to the mirror button, the mirror bracket, or the hinge plate.

18. A method of making the combination according to claim 17, said method comprising:
forming a first starting materials layer of the first starting materials;
forming a second starting materials layer of the second starting materials;
photo-polymerizing the first starting materials layer so as to produce the first adhesive layer;
photo-polymerizing the second starting materials layer so as to produce the second adhesive layer;

bonding the first adhesive layer to a major surface of the second adhesive layer; and bonding the second adhesive layer to a mirror button, a mirror bracket, or a hinge plate.

19. A thermosettable pressure sensitive adhesive tape in combination with a mirror button, a mirror bracket, or a hinge plate, said tape comprising:

a first adhesive layer having a first thickness of at least about 3 mils and comprising a first thermosettable pressure sensitive adhesive which is a photo-polymerization reaction product of first starting materials comprising a photo-polymerizable acrylic component, a thermosettable epoxy component, and a black coloring pigment, said first adhesive is not black when cured without said black coloring pigment, and said first starting materials include a sufficient amount of said black coloring pigment to cause said first adhesive to have a black color after said first adhesive is substantially cured; and a second adhesive layer having a second thickness of at least about 15 mils and comprising a second thermosettable pressure sensitive adhesive which is a photo-polymerization reaction product of second starting materials comprising a photo-polymerizable acrylic component, and a thermosettable epoxy component, said second adhesive does not turn black when cured, unless said second adhesive includes enough of a black coloring pigment to cause said second adhesive to have a black color, and said second adhesive does not include an amount of a black coloring pigment that would cause said second adhesive to have a black color after said second adhesive is substantially cured, wherein said first adhesive layer is made from a layer of the first starting materials that is thin enough to allow substantial photo-polymerization of the first starting materials even with the first starting materials containing said sufficient amount of a black coloring pigment, said second adhesive layer is made from a layer of the second starting materials that is thick enough that substantial photo-polymerization of the second starting materials would be prevented if the second starting materials contained enough of a black coloring pigment to cause said second adhesive to have a black color after said second adhesive is cured, said first adhesive layer is bonded to a major surface of said second adhesive layer, and said second adhesive layer is adhered to the mirror button, the mirror bracket, or the hinge plate.

* * * * *

UNITED STATES PATENT AND TRADEMARK OFFICE
CERTIFICATE OF CORRECTION

PATENT NO. : 10,184,070 B2
APPLICATION NO. : 13/968513
DATED : January 22, 2019
INVENTOR(S) : Dietz Page 1 of 1

It is certified that error appears in the above-identified patent and that said Letters Patent is hereby corrected as shown below:

In the Specification

Column 7
Line 24, delete "millwatts" and insert -- milliwatts --, therefor.
Line 25, delete "milijoules" and insert -- millijoules --, therefor.
Line 26, delete "milijoules" and insert -- millijoules --, therefor.
Line 44, delete "epichlorhydrin" and insert -- epichlorohydrin --, therefor.
Line 49, delete "propellor" and insert -- propeller --, therefor
Line 55, delete "-methylimidazoleyl-" and insert -- -methylimidazolyl- --, therefor.

Column 8
Line 9, delete "epichlorhydrin" and insert -- epichlorohydrin --, therefor.
Line 14, delete "propellor" and insert -- propeller --, therefor.
Lines 20-21, delete "-methylimidazoleyl-" and insert -- -methylimidazolyl- --, therefor.
Line 60, delete "3,and" and insert -- 3, and --, therefor.

Column 10
Line 7 (approx.), delete "speular" and insert -- specular --, therefor.

Column 11
Line 11 (approx.), delete "speular" and insert -- specular --, therefor.
Lines 32-33 (approx.), delete "a an" and insert -- an --, therefor.
Line 36 (approx.), delete "included" and insert -- included. --, therefor.

Signed and Sealed this
Eighteenth Day of June, 2019

Andrei Iancu
*Director of the United States Patent and Trademark Office*